May 30, 1939.　　　J. P. MINTON　　　2,160,224
MEANS FOR SEISMIC SURVEY
Filed Nov. 17, 1937　　　6 Sheets-Sheet 1

Inventor
John P. Minton
By Dallas R. Lamont
Attorney

May 30, 1939.  J. P. MINTON  2,160,224
MEANS FOR SEISMIC SURVEY
Filed Nov. 17, 1937  6 Sheets-Sheet 2

Inventor
John P. Minton
By Dallas R. Lamont
Attorney

May 30, 1939.  J. P. MINTON  2,160,224
MEANS FOR SEISMIC SURVEY
Filed Nov. 17, 1937  6 Sheets-Sheet 3

Inventor
John P. Minton
By Dallas R. Lamont
Attorney

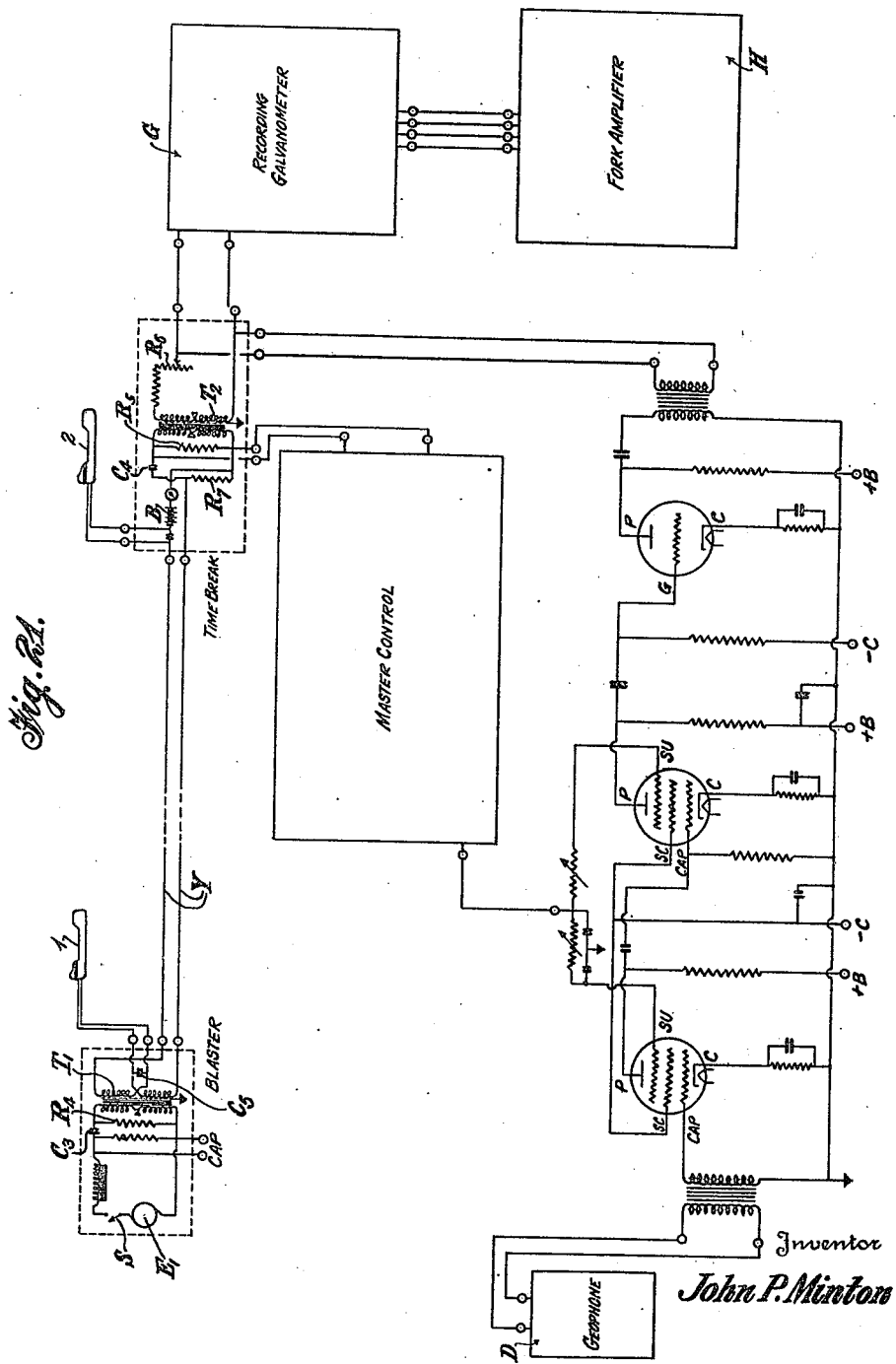

May 30, 1939.   J. P. MINTON   2,160,224
MEANS FOR SEISMIC SURVEY
Filed Nov. 17, 1937   6 Sheets-Sheet 5

Inventor
John P. Minton
By Dallas R. Lamont
Attorney

May 30, 1939.　　　　J. P. MINTON　　　　2,160,224
MEANS FOR SEISMIC SURVEY
Filed Nov. 17, 1937　　　　6 Sheets-Sheet 6

Inventor
John P. Minton

By Dallas R. Lamont
Attorney

Patented May 30, 1939

2,160,2[24]

UNITED STATES PATENT OFFICE 2,160,224

MEANS FOR SEISMIC SURVEY

John P. Minton, Dallas, Tex., assignor, by mesne assignments, to Socony-Vacuum Oil Company, Incorporated, New York, N. Y., a corporation of New York Application November 17, 1937, Serial No. 174,969

5 Claims. (Cl. 181—0.5)

This invention relates generally to method and apparatus used in exploring the subsurface strata of the earth, and more particularly to that phase of the art which deals with the detonation of an explosive for the purpose of producing seismic waves; the recording of the exact instant, at a remote point, of the detonation; the rendering more definite of the record which indicates the instant of detonation; the incorporation of means whereby telephonic communication can be had between the point where the detonation of the explosive occurs and the point where a seismographic record is being recorded; and the provision of means for recording the time break on one trace of the seismogram without otherwise affecting this trace or any of the other traces which may be carried on the same seismogram.

Prior to this invention seismograph records have not indicated accurately the instant of detonation of the explosive that is used to generate seismic waves, the principal reason being that no definite time break is present which will definitely mark the exact instant of detonation on the seismogram. By the present invention this difficulty is obviated, and definitely and accurately marked seismograms are obtained, by incorporating in the firing and recording units of the electric blasting circuit elements arranged as hereinafter described, so that a definite number of derivatives are taken electrically of the applied voltage.

Additionally when blasters of the plungers or generator type are used there is introduced into the electric circuit by the commutator brushes passing over the commutator bars, a voltage which when recorded by an oscillograph or galvanometer is of a relatively high frequency character and tends to obscure the time of detonation indication and the wave trains that are being recorded. This renders the picking of definite characteristics of the waves very difficult, and in many cases inaccurate. In this electric blasting circuit ordinary means are provided for eliminating the above defects and also for eliminating any cap lag in detonation.

Heretofore, due to the intensity of the current flowing in the blasting circuits, considerable difficulty has been encountered in recording records which are legible when electric coupling causes the time break impulse to be transmitted to all elements of adjacent circuits. To overcome these difficulties a novel circuit utilizing electrostatically shielded transformers has been designed.

Therefore, the primary object of this invention is the provision of a method and means for definitely recording on a seismogram the exact instant of detonation of the charge of explos[ive] used for the production of seismic waves in c[on]ducting seismic surveys.

This invention contemplates a method a[nd] means for electrically taking one or more deri[va]tives of an applied voltage to render the w[ave] front more abrupt.

Another object of this invention is the pro[vi]sion of means for causing the electric curr[ent] passing through the cap to increase to its ma[xi]mum value relatively slowly, thereby eliminati[ng] the possibility of any delay in detonation af[ter] the bridge wire of the electric blasting cap h[as] fused.

Still another object of this invention is the p[ro]vision of means for preventing indications whi[ch] are similar to time-break indications from be[ing] recorded when the blasting generator switch [is] first closed.

A still further object of the invention is t[he] provision of means for eliminating commutat[or] ripple from the electric circuits.

It is a further object of this invention to pr[o]vide means for eliminating mutual coupling b[e]tween adjacent circuits and to produce a b[al]anced system that will be free of cross-feedi[ng]

Another object resides in the provision of mea[ns] for controlling the amplitude of the time-bre[ak]

Still another object of this invention is to pr[o]vide means for proportioning the voltages ge[n]erated by speech modulations to time-break mo[d]ulations, so that the speech modulation voltag[es] are relatively low compared to those of the tim[e] break modulation voltage.

Another object of this invention is in the pr[o]vision of means for shortening the period of tir[ne] in which the recording instrument is affected [by] the electrical impulse which causes the tim[e] break.

Other objects and advantages of the inventi[on] will be apparent from the following detailed d[e]scription when considered in the light of t[he] drawings in which.

om an actual typical seismogram,
oduced under field conditions in
iner, showing the indefiniteness of
the purpose of determining the in-
ation.

a similar illustration of another
hich was produced in the usual
showing indefiniteness as to the
)nation.

an illustration of an actual time-
l in accordance with the teachings
on showing the definiteness with
t ascertain the instant of detona-
)losive which produces the seismic i illustration of another time-break
:ordance with the teachings of this
of greater amplitude than that
re 6.

a group of curves representing a
he first, second, third and fourth
he function, showing how the slope
e curves increases with an increas-
derivatives.

diagram illustrating a simple se-
circuit.

a diagram illustrating a simple
ice circuit.

i diagram illustrating a simple se-
circuit.

a diagram illustrating instantane-
urrent and voltage, showing their
a simple series resistance circuit.

a diagram illustrating instanta-
current and voltage, showing their
a simple series capacitance circuit.

i diagram illustrating instantane-
urrent and voltage, showing their
a simple series inductance circuit.

Figure 15:
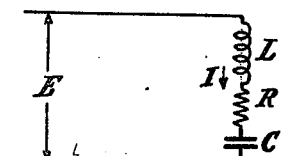
Figure 17:
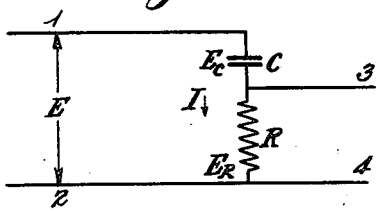

, diagram illustrating a simple se-
, resistance and capacitance cira diagram illustrating the cur-
e relationship in a circuit of the
Figure 15.

the circuit diagram for a signal
ig stage in accordance with this
ing the output leads connected
tance.

a diagram showing the voltage
he capacitance in a circuit of the
Figure 17.

a diagram showing the manner
roaches $E_c$ with a decrease in re-
ircuit of the type shown in Figa circuit diagram showing two
ig stages in accordance with this diagram illustrating an electrical
strument embodying the present curve that is plotted with current
r circuit as abscissae against time
dinates showing how the interval
i the instant of fusing the bridge
nator and the instant of detona-
hen the current in the detonator
ed to build up over a relatively
time.

an illustration of a seismogram
onable commutator ripple.

an illustration of a seismogram
reak on one trace showing how,
rith this invention, seismic waves can be recorded on the same trace only a few
thousandths of a second after the instant of deto-
nation, and showing further how the other traces
are not affected by the time-break indication.

Figure 25:
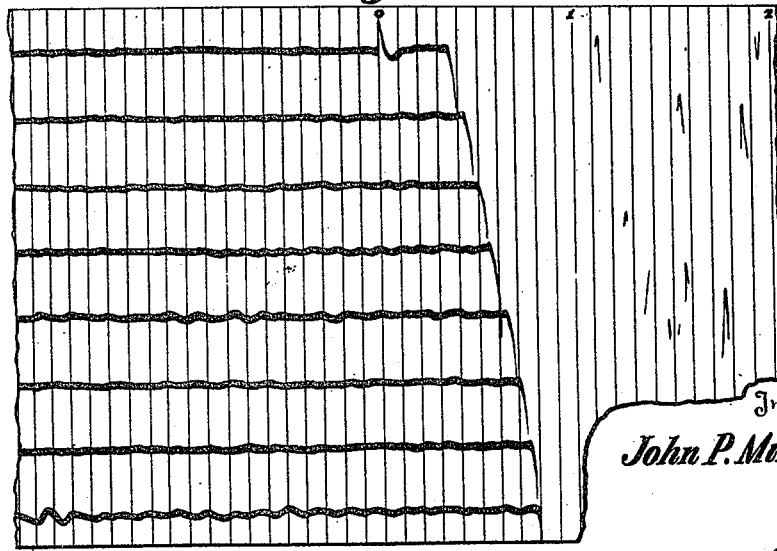

Figure 25 is a similar illustration of another
seismogram, made in accordance with this in-
vention, showing the attenuation of the time-
break and the absence of cross-feeding between
traces.

Figure 26:
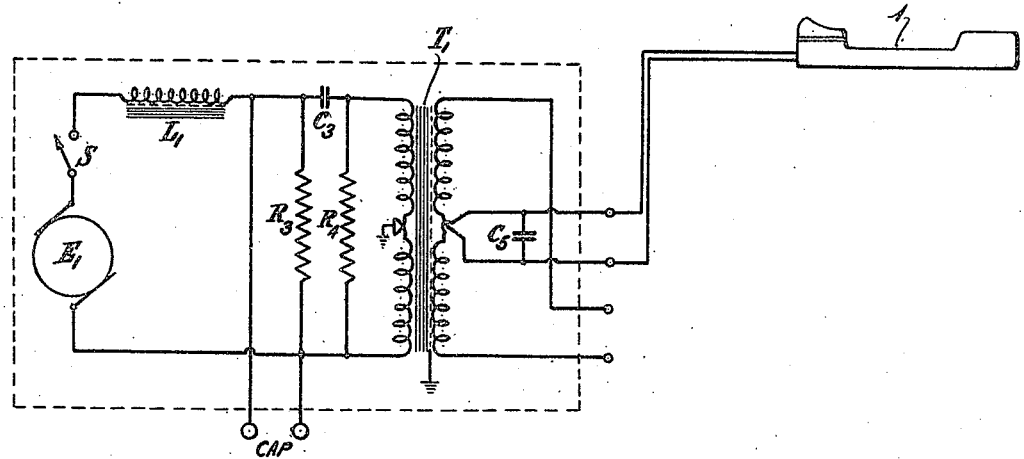

Figure 26 is an enlarged diagrammatic illus-
tration of the shot firing end of the blasting cir-
cuit.

Figure 27:
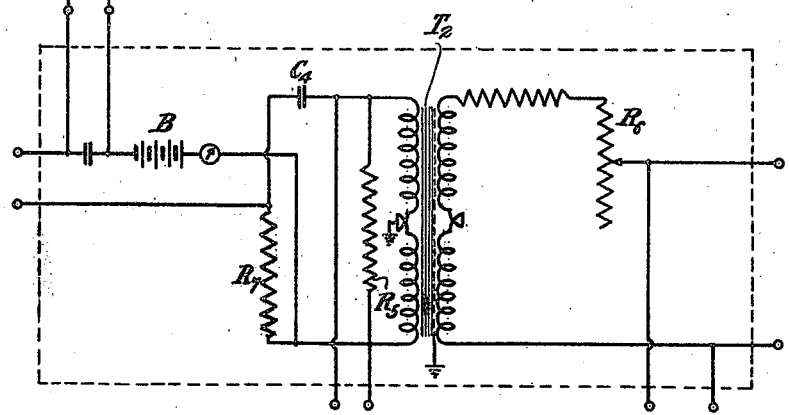

Figure 27 is an enlarged diagrammatic illus-
tration of the recording end of the blasting cir-
cuit.

Figure 1:
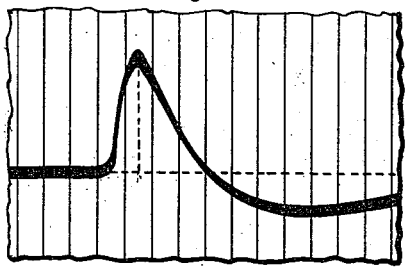
Figure 1 is a reproduction of a time-break pr[o]duced in the ordinary manner.
Figure 4:
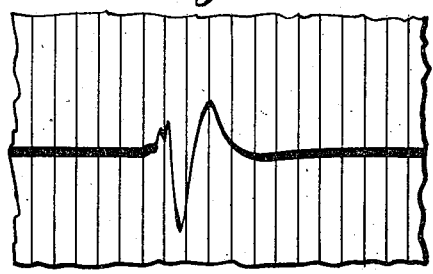
Figure 4 is an illustration of a time-brea[k]
Figure 2:
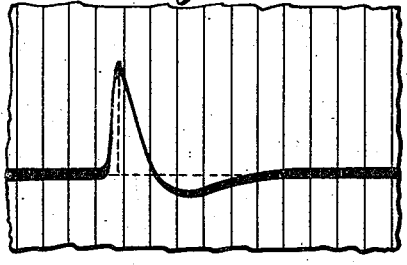
Figure 2 is a reproduction of a time-break [of] substantially equal amplitude after the first d[e]rivative has been taken electrically, in accor[d]ance with this invention.
Figure 5:
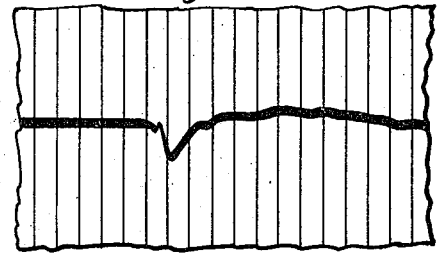
Figure 3:
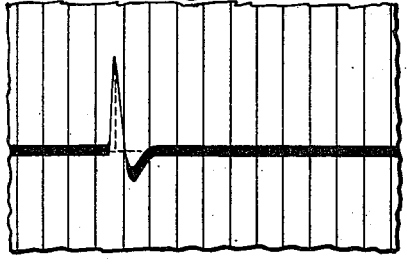
Figure 3 is a reproduction of a time-break [of] substantially equal amplitude after the secor[d] derivative has been taken electrically, in accor[d]ance with the teachings of this invention.
Figure 6:
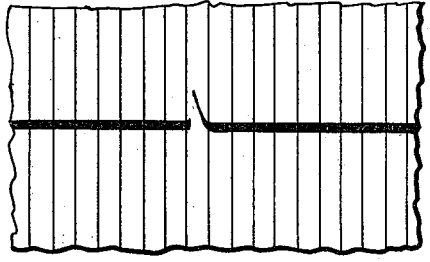
Figure 7:
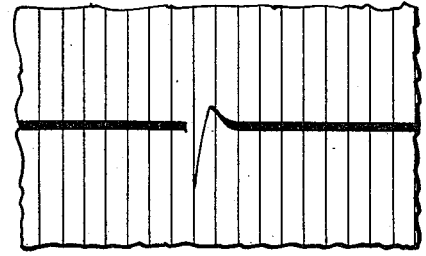

Referring to the drawings in detail, the time-
breaks shown in Figures 1, 4 and 5 illustrate
ordinary types of time-break which one obtains
without employing the derivator of this inven-
tion. Figure 2 illustrates a time-break of ampli-
tude equal to that shown in Figure 1 after hav-
ing taken the first derivative of the applied volt-
age electrically in the manner taught by this in-
vention. The effect of electrically taking the sec-
ond derivative of the applied voltage is illustrated
by Figure 3. Thus it can readily be seen by
comparison of these curves in Figures 1, 2 and 3
that not only is the initial time-break rendered
much more definite but the period of time in which
it is effective has been reduced. This latter fea-
ture enables one to record seismic waves which
originate at a point near to the recording in-
strument, without having to contend with the
wave train which customarily follows the time-
break and often lasts for a period of several hun-
dredths of a second. The illustrations of actual
records in Figures 24 and 25 also clearly show
this advantage. It will be noted that, in the case
illustrated by the upper trace in Figure 24, it was
possible to obtain a definite first break within
about .007 of a second following the time-break
(each timing line representing .01 of a second).
The upper trace in Figure 25 shows that the
effect of the time-break impulse actually does die
out entirely in a relatively short time, thereby
making it possible to record impulses originating
at a point located a relatively short distance from
the recording point.

In order to illustrate the means by which
these results are secured, reference is made to
the elementary principles of alternating cur-
rent circuits, which although well known to one
skilled in the art, will be given for purpose of
clearly explaining this invention and the results
produced in practicing the same.

Figure 9:
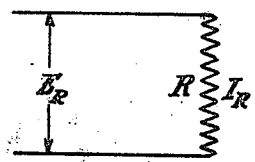
Figure 10:
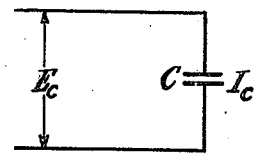
Figure 11:
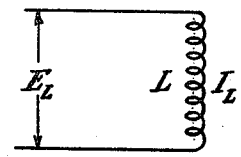
Figure 12:
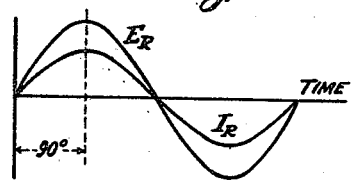
Figure 13:
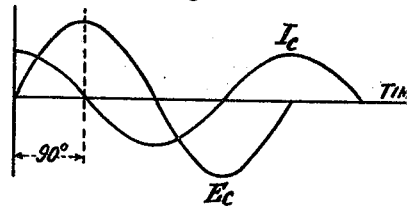
Figure 14:
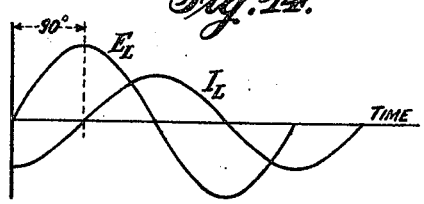

The evolution or development of the derivating
circuit can best be understood by first consider-
ing the simple resistance, capacitance, and in-
ductance circuits as illustrated in Figures 9, 10,
and 11 in which the respective elements and
quantities are given conventional representative
letters. The current and voltage relationships
in these respective circuits are represented by
the instantaneous current and voltage diagrams
of Figures 12, 13, and 14. In Figure 12, the cur-
rent is in phase with the voltage. Assuming a
pure capacitance circuit in Figure 13, the cur-
rent leads the voltage by a phase angle of 90°.
In Figure 14, assuming a pure inductance cir-
cuit, the current lags behind the voltage by a
phase angle of 90°.

Referring now to Figure 9, when a voltage $E_R$
is impressed across the resistance R a current $I_R$
flows through R. In time relationship I and E are always in phase, as shown in the diagram in Figure 12, and by Ohm's law $$\frac{E_R}{R} = I_R$$

That is, the current through resistance R is proportional to the impressed voltage $E_R$. However, in Figure 10 a voltage $E_c$ is impressed across a condenser causing a current $I_c$ to flow through the capacitance. In this case, as illustrated in Figure 13, the current $I_c$ leads the voltage $E_c$ by a phase angle of 90°. Here $$I_c = C\frac{dE_c}{dt}$$

That is, the current $I_c$ through a capacitance is proportional to the derivative of the voltage $E_c$ across the capacitance C with respect to time. In the case illustrated in Figure 14, a voltage $E_L$ is impressed across an inductance L, causing a current $I_L$ to flow through the inductance. This current $I_L$ lags behind the voltage $E_L$ by a time phase angle of 90°, as shown in Figure 14. In this case the current $$I_L = 1/L \int E_L dt$$

the current $I_L$ flowing through L is proportional to the integral of the impressed voltage $E_L$.

Figure 16:
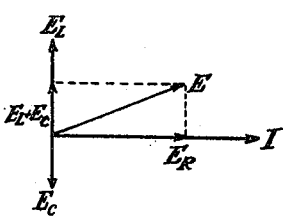

Therefore, if we have a resistance, capacitance and inductance connected in series and a voltage E impressed across the entire combination, as illustrated in Figure 15, we have $E = E_R + E_c + E_L$, or $$E = RI + \frac{1}{C}\int I dt + L\frac{dI}{dt}$$

the same current flowing through all the elements. The voltage across the inductance L will be a voltage that is proportional to the time derivative of the current I; across C, a voltage that is proportional to the time integral of the current I; and across the R, a voltage that is proportional to the current I. This relationship is vectorially illustrated in Figure 16.

With the above principles in mind one can readily follow the development of the derivating circuit which follows. With an arrangement of elements such as is illustrated in Figure 17, by impressing a given E across the circuit at the points 1 and 2, a current I will flow through the circuit. The value of this current will be equal to $$C\frac{dE_c}{dt}$$

and also equal to $$\frac{E_R}{R}$$

Figure 18:
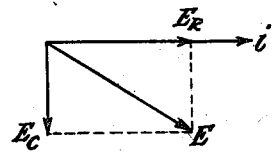
Figure 19:
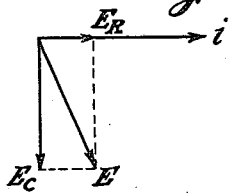

This relationship can be illustrated as shown in Figure 18. Now if the capacitance and resistance are both made small, so that, at the frequencies encountered, the voltage drop across C is far greater than across R, then a condition is reached where the current is leading the voltage substantially 90 degrees and is substantially proportional to the derivative of the applied voltage E. This is illustrated in Figure 19.

Figure 20:
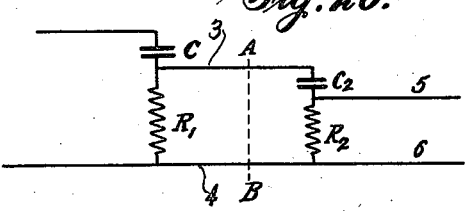

Therefore, a small component of voltage across the resistance R is obtained that is substantially proportional to the derivative of the impressed voltage E. This component of voltage is obtained at the terminals 3 and 4. Then by connecting across the terminals 3 and 4 another condenser $C_2$ and resistance $R_2$, as shown in Figure 20, a second circuit by means of which the second derivative can be taken is obtained. The voltage measured at the points 5 and 6 across $R_2$ is substantially pro derivative of the voltage meas and 4 across $R_1$, which voltage stantially proportional to the voltage impressed at the termi By adding more derivative this same manner any desired tives can be taken electrically t to produce a definite time-bre circuit embodying this inventio as six derivating stages has be erated successfully.

Figure 8:
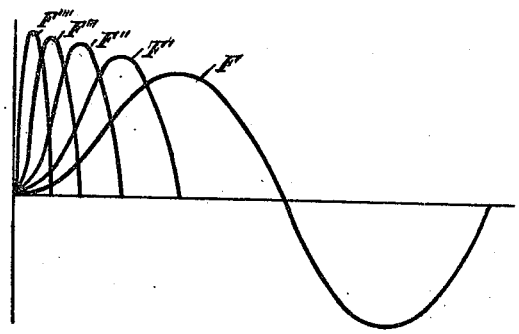

The manner of sharpening the kind involved in producing dication, by taking derivatives t break definite is illustrated by in Figure 8. The curve marked original function and F', F'', F resent the first, second, third, tives, respectively.

In Figure 21 there is shown blaster circuit with that porti detonates the explosives, and i by the shot firer, separated by the portion which is carried as corder. The broken lines rep conductors which may be of a dependent upon the distance where the explosive is detonat recorded. In this figure con are given conventional identify is connected in series with a s a switch S, an iron core indu and a resistance $R_3$. The el or caps are connected in pa sistance $R_3$. The resistance, ample, about 100 ohms, that firing leads about 5 ohms. T be chosen at about the value purpose of limiting the electri the derivating circuit consisti $C_3$ and the resistance $R_4$. The li voltage, in this manner, is magnitude to the time-break ficient voltage from the sur preciable cross-feeding to the figures as stated above, of co kind and type of blasting dev the caps. They are illustrat blasters, for example, if $R_3$ 1,000 ohms, the time-break relatively large, and the time to the other traces would lik cuit described thus far is all actually detonate the blast switch S is closed. However the instant of detonation a strument, which is normally mote point, some means o signal of necessity must be ally, the present invention u means referred to above to desired characteristics. The is added a derivating stage s above consisting of a cond sistance $R_4$ in series. This connected across the resista a larger scale in Figure 26. as described above, will elect derivative of the voltage tha $R_3$. In order to carry the through the circuit and to recorded impulse from bein coupling or cross-feeding an electrostatically shielde l secondary type, having
nals connected to the re-
sistance R4, is used. To
gh the primary the center
ther, as shown in Figure
ed ratio winding may be
dependent upon the con-
is preferred to employ a of this electrostatically
e then connected to con-
oken lines in Figure 21,
h the recording unit of
the signal on its way to
meter G can, if desired,
or more additional de-
d derivating stage con-
C4 and the resistance R5
voltage across R5, which
ivative, is then impressed
second electrostatically
of the same type and
er taps of the primary
her to complete the pri-
e functions of this trans-
at discussed in connec-
former; namely, to pre-
e signal which has been
secondary is then con-
ble resistance R6 to the
meter element G. The
lected can be used at the
ame manner as the re-
, multiple element gal-
which is illustrated, to
s generated by the geo-
and in sympathy with
amplitude by the ampli-
esistance R6 is used to
f the time break and is utilized as a telephone
widing a means of com-
recorder and shot firer.
e ( across the condenser
the circuit and inserting
ne conductor Y, near the
mmunication can be es-
condensers across these
e to its abnormally high
igh the condensers with-
in amplitude. The nec-
tential is placed on the
necting a battery B in
the telephone. An am-
i characteristics may be
e battery for purpose of
irect current in the tele-
nce R7 of suitable size
n Figure 21 in order to
nt circuit for the telemplete operative system
e 21, in addition to the
D, the two units of the
mplifier J, a master con-
nerator and its amplifier
ator is usually an elec-
is utilized to generate
redetermined frequency.
fied drives a timing de-
ve recorded on a sensi-
g film transverse lines
small intervals of time.
this character considerable difficulty has been encountered due to the
presence of cross-feeding, which is caused by
electrostatic coupling between adjacent circuits,
the lack of properly proportioning the voltages
generated by speech modulations to those of time-
break modulations, and stray currents which may
be picked up from external sources, such as high
tension power lines adjacent to the recording in-
strument. In the circuit of this invention these
difficulties are overcome by grounding the pri-
mary center taps on the electrostatically shield-
ed transformers $T_1$ and $T_2$, as shown in Figures
26 and 27. In some cases to produce the best
results it is found desirable to connect the ground-
ed center taps to a ground which actually extends
out of the unit and contacts the earth's surface.
Although this is desirable in some cases, in others,
good results are produced without this ground.

The iron core inductance or choke $L_1$ in the
circuit illustrated in Figure 26 serves a threefold
purpose. The most important of these being,
that it causes the current through the electric
blasting cap or caps to build up to its maximum
value at a relatively slow rate, thereby insuring
no lag in detonation after the bridge wire in the
cap is fused.

Figure 22:
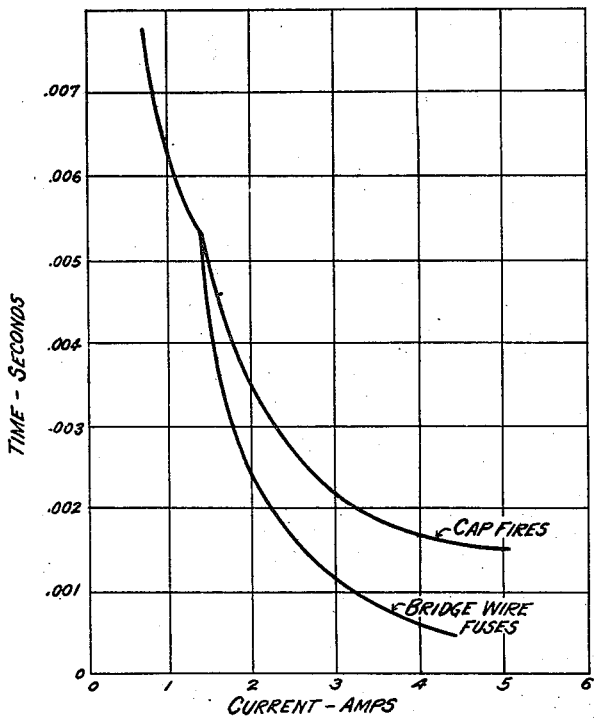

By referring to the cap-lag curves illustrated
in Figure 22, it is seen that if the bridge wire
fuses in a short time, the time necessary for the
cap to fire is substantially longer than that re-
quired for the bridge wire to fuse; whereas, if
the current is allowed to build up through the
cap over a long period of time, the period be-
tween the fusing of the bridge wire and the
detonation of the cap disappears or becomes very
short and negligible. Therefore, the importance
of the use of the iron core inductance or choke $L_1$
becomes apparent.

Another function of this iron core inductance
or choke $L_1$ is to prevent any false time-breaks
from appearing on the record ahead of the real
time-break which occurs when the cap fires.
Since in seismograph work one is dealing with
thousandths of a second, it is necessary that these
artificial time-breaks which tend to confuse the
interpreter be eliminated from the record.

Figure 23:
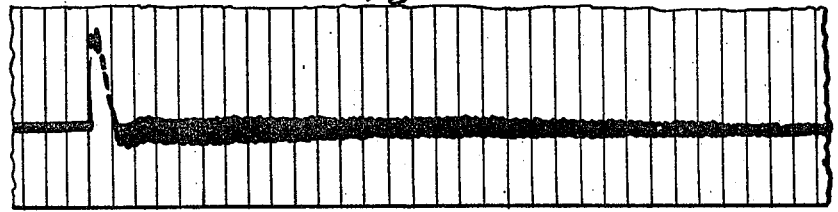
Figure 24:
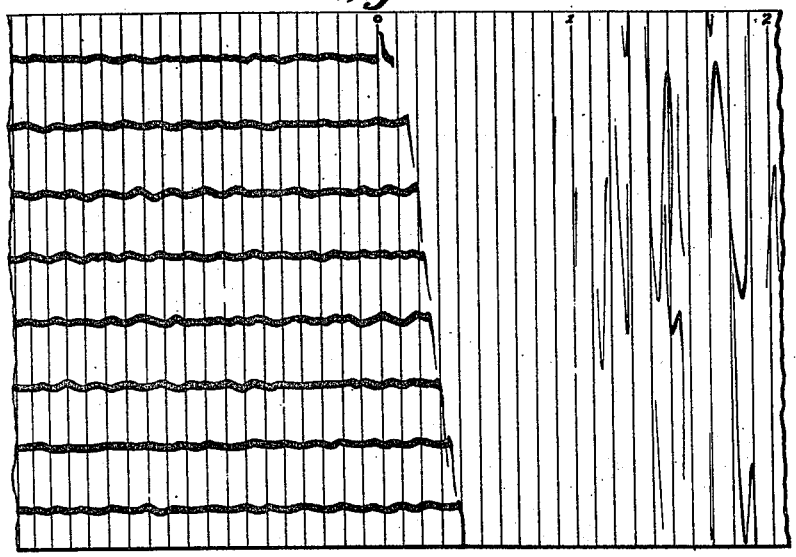

The third function of this iron core inductance
or choke $L_1$ is of extreme importance in geophysi-
cal work. It serves to block out commutator
ripple so that there is no evidence of it on the
seismogram. Figure 23 illustrates a record which
has been recorded without the iron core in-
ductance in the circuit. In this record one will
observe that the commutator ripple generated
by the deceleration of the blasting generator is
so bad and of such great amplitude that it might
be impossible to determine the exact instant at
which the first impulse of energy of an incom-
ing seismic wave train was recorded on this
trace. Figures 24 and 25 show illustrations of
actual records which were recorded while the
iron core inductance was in the circuit. It will
be noted that there is no commutator ripple and
that first impulses from seismic waves can be
identified on the trace carrying the time-break
as easily as on those which are not connected
to the blasting circuit.

Although this invention has been described in
detail as applicable to a circuit utilizing the
plunger or generator type blaster, it is equally
applicable when the plunger or generator type
blaster has been replaced by a battery, condenser
bank, or transformer as a source of energy. The
only change necessary to employ these other sources of power being merely the substitution of one for the other.

The method of operation of this circuit can best be understood when described in connection with the circuit diagram shown in Figure 21. A cap or a plurality of caps are first connected as shown in the diagram. Then after the shot firer has established by telephonic communication with the recorder that everything is in readiness to record the seismic waves when generated by the explosion, the cap or caps are then fired. If a plunger or generator type blaster is used, the shot firer raises the plunger and forces it downwardly thereby accelerating the generator to a speed which will produce the desired voltage. Just before the plunger reaches the bottom of its stroke the switch S is automatically closed, completing the circuit through the cap or caps and the choke $L_1$. Due to the function of the choke, the current will build up slowly through the cap line until the cap bridge wire fuses enabling the detonation of the cap to take place at substantially the same instant that the wire bridge fuses. Since the resistance of the cap or caps is relatively low as compared to that of $R_3$, a very small portion of the current will pass through $R_3$, while the cap circuit is complete. But at the time this circuit is ruptured by the fusing of the bridge wire in the cap a potential pulse is impressed across the resistance $R_3$. Since the condenser $C_3$ and resistance $R_4$ which comprises the first derivating stage is in parallel with $R_3$, the same voltage impressed across $R_3$ will in like manner be impressed across the derivating stage. The condenser $C_3$ and resistance $R_4$ will then function to take the derivative of this voltage electrically. If the primary of an electrostatically shielded transformer be connected across the resistance $R_4$, as shown, this derivative of the original high frequency surge of current will be transformed to the secondary of the transformer. The outer terminals of the tapped secondary winding are connected to the conductors Y which communicate with the recording end of the system, and this voltage then, which is a derivative of the original high frequency surge, will be impressed across the resistance $R_7$. Since the condenser $C_4$ is connected in series with the resistance $R_5$ and the series combination, comprising a second derivating stage, is in parallel with $R_7$, then the voltage surge which is the derivative of the original surge will have its second derivative taken electrically. Then by connecting the primary of the second electrostatically shielded transformer $T_2$ across the resistance $R_5$, this same voltage which is the derivative of the derivative of the original high frequency surge, will be transformed to the secondary of the transformer. By connecting the outer leads of this tapped secondary through a variable resistance $R_6$ to the vibrating element of a galvanometer this signal, which is in reality an indication of the time of detonation of the explosion which generated the seismic waves to be recorded, is impressed across the galvanometer element and will actuate it to record on the seismogram a definite time at which the explosion was detonated.

As previously described, due to the fact that the circuit is balanced by grounding the central taps of the primary windings of the transformers, the voltages generated by voice modulations are so proportioned to those generated by the time-break signal modulations that none of the voice modulation voltages will be carried through the circuit to the recording Therefore, any disturbance such shouting into the telephone or vib are generated by the wind blowing phone would not in any way distur ing element. This feature makes use the same galvanometer element time-break signal is recorded seismic waves.

The condensers $C_3$ and $C_4$, in ad ing as elements of the derivating s a safeguard against premature det cap or caps by any direct curren used in the system, such for exam phone communications. With the present in the circuit, it is apparen cuit can be used with safety un other than those where a perfectly tem is desired.

I claim:

1. In combination with an electri an electric circuit for detonating e caps comprising in combination energy, common means for retard which the current is built up in and eliminating spurious voltages mutator ripple voltages from th cuit, electric derivating means for rivative electrically of a transient ing means, and signal commu connecting said blasting circuit t means, whereby a definite indica stant of detonation of the cap m 2. In combination with an elect a blasting circuit, said blasting ci a source of voltage, a switch, a ductance and a resistance conr a pair of leads whereby an elect can be connected in parallel with derivating means also connected the resistance comprising a cond resistance connected in series, a t ing its primary winding conne with the second resistance, a nometer, signal communicating ing the secondary of said trans galvanometer whereby a signal blasting circuit at the time of c cap may be derivated, transmit nometer and recorded.

3. In combination with an elec a blasting circuit, said circuit co bination a source of electric ene an electric blasting cap connect sistance connected in parallel cap, derivating means connecte said resistance and electric b derivating means comprising a resistance connected in serie having its primary winding cor with said derivating resistance, nometer, and a signal communi necting the secondary of said the recording galvanometer, w voltage produced at the time the electric blasting cap w derivated and transformed t munication circuit and recorde by the recording galvanomete 4. In an electrical seismogr a vacuum tube amplifier, a nected to the input of said a connected to the output of s timing means associated with adapted to cooperate with sa nected to the output of said amplifier and a timing means associated with said recorder and adapted to cooperate with said recorder to produce a seismogram, an electric blasting circuit for detonating an explosive, said circuit comprising means for generating a transient voltage in said circuit at the instant of detonation of the explosive, and an electric circuit adapted to transmit the impulse of said voltage to a recorder, the improvement that comprises electrical derivative taking means in said signal transmitting circuit adapted to take a plurality of derivatives of said transient voltage to distort said voltage and render the wave front thereof more abrupt in character.

JOHN P. MINTON.